United States Patent [19]

Kito et al.

[11] Patent Number: 5,721,059
[45] Date of Patent: Feb. 24, 1998

[54] TEMPERATURE-DEPENDENT COLOR/ TRANSPARENCY STORING RESIN COMPOSITION AND LAMINATE MEMBER EMPLOYING THE SAME

[75] Inventors: Tsutomu Kito, Tajimi; Kuniyuki Senga, Kasugai; Hiroyuki Hayashi, Gifu-ken, all of Japan

[73] Assignee: The Pilot Ink Co., Ltd., Nagoya, Japan

[21] Appl. No.: 705,148

[22] Filed: Aug. 29, 1996

[51] Int. Cl.⁶ .................. C08K 5/3435; B32B 27/08; B32B 27/30
[52] U.S. Cl. .................. 428/522; 428/520; 428/913; 524/99; 524/563; 523/206; 252/583
[58] Field of Search ............ 524/99, 563; 523/206; 428/913; 252/583

[56] References Cited

U.S. PATENT DOCUMENTS

| | | | |
|---|---|---|---|
| 1,592,148 | 7/1926 | Munn | 401/1 |
| 4,028,118 | 6/1977 | Nakasuji et al. | 106/21 E |
| 4,176,273 | 11/1979 | Fujie | 219/220 |
| 4,720,301 | 1/1988 | Kito et al. | 106/21 A |
| 4,725,462 | 2/1988 | Kimura | 428/29 |
| 4,818,215 | 4/1989 | Taga | 431/126 |
| 4,820,683 | 4/1989 | Vervacke et al. | 503/210 |
| 4,895,827 | 1/1990 | Vervacke et al. | 503/210 |
| 4,917,643 | 4/1990 | Hippely | 446/14 |
| 4,920,991 | 5/1990 | Shibahashi et al. | 132/73 |
| 5,011,445 | 4/1991 | Nakasuji et al. | 446/14 |
| 5,079,049 | 1/1992 | Kito et al. | 428/24 |
| 5,085,607 | 2/1992 | Shibahashi et al. | 446/14 |
| 5,219,625 | 6/1993 | Matsunami et al. | 428/30 |
| 5,316,553 | 5/1994 | Nakagawa et al. | 446/14 |
| 5,352,649 | 10/1994 | Shibahashi et al. | 503/207 |
| 5,376,772 | 12/1994 | Nakagawa et al. | 219/227 |
| 5,466,283 | 11/1995 | Kondo et al. | 106/25 R |
| 5,490,956 | 2/1996 | Kito et al. | 252/583 |
| 5,502,967 | 4/1996 | Nakagawa et al. | 62/3.3 |
| 5,558,699 | 9/1996 | Nakashima et al. | 106/21 A |
| 5,558,700 | 9/1996 | Shibahashi et al. | 106/21 A |
| 5,585,425 | 12/1996 | Kito et al. | 524/324 |

FOREIGN PATENT DOCUMENTS

| | | |
|---|---|---|
| 0024885 | 3/1981 | European Pat. Off. . |
| 0526019 | 2/1993 | European Pat. Off. . |
| 0659582 | 6/1995 | European Pat. Off. . |
| 0677564 | 10/1995 | European Pat. Off. . |
| 2538309 | 6/1984 | France . |
| 2591534 | 6/1987 | France . |
| 59-156790 | 9/1984 | Japan . |
| 60-264285 | 12/1985 | Japan . |
| 07040660 | 2/1995 | Japan . |
| 2135466 | 8/1984 | United Kingdom . |
| 2184250 | 6/1987 | United Kingdom . |
| 2205255 | 12/1988 | United Kingdom . |

*Primary Examiner*—Tae Yoon
*Attorney, Agent, or Firm*—Fitzpatrick, Cella, Harper & Scinto

[57] ABSTRACT

A temperature-dependent color/transparency storing resin layer is composed by dispersing and fixing a mutually dissolved homogeneous composition consisting of (A) an electron-donating color-developing organic compound, (B) a compound having a phenolic hydroxyl radical, and (C) a compound selected from alcohols, esters, ketones and carboxylic acids, in vinyl chloride-vinyl acetate-copolymer matrix resin, as small particles, and capable of exhibiting reversible change in color and in transparency in response to a temperature variation with hysteresis, and selectively storing a state developed above the high trigger temperature and a state developed below the low trigger temperature in a temperature range between the high and low trigger temperatures, wherein the transparency is improved by blending vinyl chloride-vinyl acetate-vinyl alcohol copolymer and/or vinyl chloride-vinylidene chloride copolymer as an agent for improving the transparency in said matrix resin so as to regulate the transparency and to conspicuously improve the transparency especially exhibited in a temperature range above the high trigger temperature, so as to constitute a laminate member to be applied in various fields.

16 Claims, 5 Drawing Sheets

TEMPERATURE-DEPENDENT COLOR/ TRANSPARENCY STORING RESIN COMPOSITION AND LAMINATE MEMBER EMPLOYING THE SAME

BACKGROUND OF THE INVENTION

1. Field of the Invention

The present invention relates to a temperature-dependent color/transparency storing resin composition and a laminate member employing the same. More specifically, the present invention relates to a temperature-dependent color/ transparency storing resin composition which is composed in such a manner that a temperature difference between low and high trigger temperatures is in a range from 10° C. to 50° C., each state changed in a temperature range below said low trigger temperature or above said high trigger temperature is selectively stored in a temperature range between the low and high trigger temperatures, and, in particular, a state having the transparency conspicuously improved is exhibited in a temperature range above the high trigger temperature, as well as a laminate member employing such resin composition.

2. Related Background Art

A conventional color storing thermochromic material capable of changes with respect to temperature/color density with significant hysteresis was disclosed in the Japanese Patent Publication No. 4-17154, or the like.

Said publication proposes that a specific compound is selected as the reactive medium to be employed in a thermochromic material consisting of three essential components, i.e., an electron-donating color-developing organic compound, electron-accepting compound and a reactive medium of said both compounds, so as to exhibit significant hysteresis, thereby storing in a specific temperature range a color before and after the color change even after the heat or cool heat required for the color change is removed. Usually, a thermochromic material of this type is put to practical use in the form of a microencapsulated pigment in which said three essential components are contained in microcapsule.

Apart from this, there is disclosed a thermochromic light-shielding/-transmitting material which develops significant hysteresis due to a change in the temperature and reversibly exhibits a colored opaque state and a colorless transparent state in the Japanese Patent Application Laid-Open No. 6-135144. Said application proposes a thermochromic material in a non-microencapsulated form which is capable of developing said hysteresis effectively so as to exhibit a reversible change between the transparent state and the opaque state together with a change in color without application of a specific compound as a reactive medium, by fixing in a dispersed manner a mutually dissolved composition consisting of the above-mentioned three essential components in vinyl chloride-vinyl acetate copolymer serving as the matrix resin.

The present inventors made further investigation on the thermochromic material in a non-microencapsulated form which varies in transparency together with a color change, while showing significant hysteresis, and found a fact that the transparency can be of conspicuously improved both in the colored and uncolored states by blinding a specific copolymer in addition in said conventional matrix resin, thereby perfecting the present invention.

The above-mentioned thermochromic material in a microencapsulate form has a problem that the transparency of a thermochromic layer which is obtained by fixing in a dispersed manner particles of pigments of the thermochromic material in the transparent resin is conspicuously damaged by a light-scattering phenomenon of said pigment particles covered by the microcapsule wall, so that, it is difficult to see through images of an underlaying picture or the like in a system in which said layer is provided in a separated manner, though an underlaying picture is visible in a system in which said layer is laminated on the underlaying picture or the like in a tightly contacted manner.

On the other hand, the above-proposed thermochromic material in a non-microencapsulated form has been comparatively improved in terms of the transparency in the uncolored state, which, however, is not yet sufficient. For the human eyes, a substance has a haze value not more than 35% in general when it is seen to be transparent. The present inventors have made further investigations to improve the transparency in order to obtain the above-mentioned haze value. When the haze value becomes 35% or more, a slight haze or opacity in the uncolored state hindered the light-transmittance of the above-mentioned optical properties in a system in which an underlayer is composed of a material having luster or metallic gloss. As a result, the aimed visual effect is not always be satisfied.

SUMMARY OF THE INVENTION

The present invention aims to remove the drawbacks mentioned above and intends to provide a thermochromic material in which a transparency in the uncolored state is conspicuously improved. More specifically, the present invention intends to provide a temperature-dependent color/ transparency storing resin composition which is capable of changing the transparency together with a color change in response to a temperature variation while showing significant hysteresis, or exhibiting reversible change between the uncolored transparent state and the colored opaque state, so as to selectively store each of the states before and after the change in a specific temperature range, as well as a laminate member employing the resin composition.

According to the first aspect of the present invention, there is provided a temperature-dependent color/ transparency storing resin layer which is composed by dispersing and fixing a mutually dissolved homogeneous composition consisting of (A) an electron-donating color-developing organic compound, (B) a compound having a phenolic hydroxyl radical, and (C) a compound selected from alcohols, esters, ketones and carboxylic acids, in vinyl chloride-vinyl acetate-copolymer matrix resin, as small particles, and capable of exhibiting reversible change in color and in transparency in response to a temperature variation with hysteresis with a temperature difference of 10° C. to 50° C. between the low trigger temperature and the high trigger temperature, having the transparency exhibited above the high trigger temperature higher than that exhibited below the low trigger temperature, and reversibly storing a state developed above the high trigger temperature and a state developed below the low trigger temperature in a temperature range between the high and low trigger temperatures, wherein the transparency thereof is improved by blending vinyl chloride-vinyl acetate-vinyl alcohol copolymer and/or vinyl chloride-vinylidene chloride copolymer as an agent for improving the transparency in the matrix resin so as to adjust the transparency.

Here, a trigger temperature means a temperature at which "change in color and in transparency" occurs. More specifically, the colored transparent state or the colored opaque state is exhibited at a temperature below the low trigger temperature, while the uncolored transparent state is exhibited above the high trigger temperature, and the both exhibited states mentioned above are selectively stored in a temperature range between the low and high trigger temperatures.

As stated above, the present invention is characterized by the structure in which the mutually dissolved composition composed of the three essential components functioning as thermochromic components is fixed in the matrix resin which is obtained by blending vinyl chloride-vinyl acetate copolymer with vinyl chloride-vinyl acetate-vinyl alcohol copolymer and/or vinyl chloride-vinylidene chloride copolymer as the agent for improving the transparency, in a dispersed manner as small particles or in a solid soluble state in which particle sizes can not be confirmed by a microscope. According to this structure, the thermochromic components are maintained stably in the matrix resin to develop significant hysteresis, and the function of selectively storing a reversible change between the colored transparent or colored opaque state and the uncolored transparent state in a specific temperature range is developed, whereby these functions can be normally carried out, and, in particular, the transparency in the uncolored state mentioned above is conspicuously improved.

The vinyl chloride-vinyl acetate-vinyl alcohol copolymer or vinyl chloride-vinylidene chloride copolymer which is employed in combination with the above-mentioned vinyl chloride-vinyl acetate copolymer functions to conspicuously improve the transparency, and is usually blended in a range from 10 to 70 parts by weight in the vinyl chloride-vinyl acetate copolymer. The effect of improving the transparency can not be obtained if the copolymer is blended in a range of 10 parts by weight or less. When the copolymer is blended in a range of 70 parts by weight or more, the adhesive property of the three essential components functioning as the thermochromic components in the matrix resin is lowered. As a result, the compound (C) is separated into the matrix resin or onto the surface of the matrix resin and no uniform color change does not occur. In this case, the two copolymers mentioned above may be employed in combination.

Also, another mutually soluble resin may be mixed into the matrix resin in a ratio of 30 parts by weight or less. Such a small amount of the resin component can be employed for providing the adhesive property at the secondary working, improving the film strength, etc., within an extent not affecting the basic functions of the present invention, namely changes in color and transparency in response to a temperature variation.

Examples of such other mutually soluble resin include denatured alkyd resin, unsaturated polyester resin, saturated polyester resin, epoxy resin, amino resin, polyurethane resin, oil-soluble cellulose resin, hydrocarbon resin, vinyl acetate resin, butyral resin, acrylic resin, methyl methacrylate resin, styrene-butadiene copolymer resin, ethylene-vinyl acetate copolymer resin, chlorinated polypropylene resin, polyamide resin, styrene resin, acrylate-styrene copolymer resin, styrene-maleic acid copolymer resin, chlorinated rubber, silicone resin, vinyl chlorideacrylate copolymer resin and ketone resin.

The electron donating color-developing organic compound to be employed in the present invention is composed of so-called leuco dye, capable of developing color by a compound having a phenolic hydroxyl radical, and selected from diphenylmethane phthalides, fluoranes, diphenylmethane azaphthalides, indolyl phthalides, phenylindolyl phthalides, phenylindolyl azaphthalides styrylquinolines, piperidine compounds, quinazoline compounds, bisquinazoline compounds, etc.

Examples of such organic compound include 3,3-bis(p-dimethylaminophenyl)-6-dimethylaminophthalide, 3-(4-diethylaminophenyl)-3-(4-diethylamino-2-methylindol-3-yl)phthalide, 3-(4-diethylamino-2-ethoxyphenyl)-3-(1-ethyl-2-methylindol-3-yl)-4-azaphthalide, 1,3-dimethyl-6-diethylaminofluorane, 2-chloro-3-methyl-6-dimethylaminofluorane, 3-dibutylamino-6-methyl-7-anilinofluorane, 3-diethylamino-6-methyl-7-anilinofluorane, 3-diethylamino-6-methyl-7-xylidinofluorane, 2-(2-chloroanilino)-6-dibutylaminofluorane, 3,6-dimethoxyfluorane, 3,6-di-n-butoxyfluorane, 1,2-benz-6-diethylaminofluorane, 1,2-benz-6-dibutylaminofluorane, 1,2-benz-6-ethylixoamylaminofluorane, 2-methyl-6-(N-p-tolyl-N-ethylamino)fluorane, 2-(N-phenyl-N-methylamino)-6-(N-p-tolyl-ethylamino)fluorane, 2-(3'-trifluoromethylamilino)-6-diethylaminofluorane, 3-chloro-6-cyclohexylaminofluorane, 2-methyl-6-cyclohexylaminofluorane and 3-methoxy-4-dodecoxystyrylquinoline.

The compound having a phenolic hydroxyl radical can be monohydric, dihydric or polyhydric phenol, eventually having alkyl, aryl, acyl, alkoxycarbonyl, carboxyl or ester thereof, or amido radical or a halogen atom as the substituent of the benzene ring, or can be bis- or trisphenol. Examples of such phenolic compound capable of developing color in the electro-donating color-developing organic compound include phenol, o-cresol, tert-butylphenol, nonylphenol, n-octylphenol, n-dodecylphenol, n-stearylphenol, p-chlorophenol, p-bromophenol, o-phenylphenol, n-butyl p-hydroxybenzoate, n-octyl p-hydroxybenzoate, n-dodecyl p-hydroxybenzoate, resorcin, dodecyl gallate, 2,2-bis(4'-hydroxyphenyl)propane, 4,4'-dihydroxydiphenylsulfone, 1,1-bis(4'-hydroxyphenyl)ethane, 2,2-bis(4'-hydroxy-3-methylphenyl)propane, bis(4'-hydroxyphenyl)methane, bis(4-hydroxyphenyl)sulfide, 1-phenyl-1,1-bis(4'-hydroxyphenyl)ethane, 1,1-bis(4'-hydroxyphenyl)-3-methylbutane, 2,2-bis(4'-hydroxyphenyl)butane, 2,2-bis(4'-hydroxyphenyl)ethyl propionate, 2,2-bis(4'-hydroxyphenyl)-4-methylpentane, 1,1-bis(4'-hydroxyphenyl)-2-methylpropane, 2,2-thiobis(6-tert-butyl-3-methylphenol), 2,2-bis(4'-hydroxyphenyl)hexafluoropropane, 1,1-(4'-hydroxyphenyl)n-hexane, 1,2-bis(4'-hydroxyphenyl)n-heptane, 1,1-bis(4'-hydroxyphenyl)n-octane, 1,1-bis(4'-hydroxyphenyl)n-nonane, 1,1-bis(4'-hydroxyphenyl)n-decane, 1,1-bis(4'-hydroxyphenyl)n-dodecane, 2,2-bis(4'-hydroxyphenyl)n-heptane, and 2,2-bis(4'-hydroxyphenyl)n-nonane.

In general, the phenolic compound has a relatively high polarity, because of the phenolic hydroxyl radical thereof, and is therefore poorly soluble in the component (C) of low polarity.

In the matrix resin, such poor solubility tends to cause precipitation of separation of the phenolic compound and the component (C), thus resulting in bleeding or hindering satisfactory reversible color change, which results in instability in practical use.

For this reason, a phenolic compound, represented by the following general formula is preferably employed as 100 wt. %, or at least 50 wt. % of the component having phenolic hydroxyl radical. The compound of the following general formula is particularly preferable as the phenolic compound showing satisfactory solubility in the component (C):

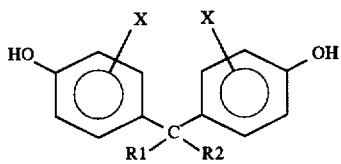

wherein R1 stands for H or CH$_3$; R2 stands for C$_n$H$_{2n+1}$ (4<n<11) which is a straight- or branched-chain alkyl radical; or R1=R2=CF$_3$; and X stands for a substituent on aromatic ring which is H or CH$_3$.

Non-limitative examples of the compound of the foregoing general formula include 1,1-bis (4-hydroxyphenyl)-4-methylbutane, 1,1-bis(4'-hydroxyphenyl)n-pentane, 1,1-bis (4'-hydroxyphenyl)n-hexane, 1,1-bis(4'-hydroxyphenyl)n-heptane, 1,1-bis(4'-hydroxyphenyl)n-octane, 1,1-bis(4'-hydroxyphenyl)n-nonane, 1,1-bis(4'-hydroxyphenyl)n-dodecane, 2,2-bis(4'-hydroxyphenyl)n-heptane, 2,2-bis(4'-hydroxyphenyl)n-nonane, 1,1-bis(3'-methyl-4'-hydroxyphenyl)n-hexane, and 2,2-bis(4'-hydroxyphenyl)-hexafluoropropane.

Alcohols to be employed in the present invention are saturated aliphatic monohydric alcohols with ten or more carbon atoms. Examples of such alcohols include decane-1-ol, undecane-1-ol, lauryl alcohol, tridecane-1-ol, myristyl alcohol, pentadecane-1-ol, cetyl alcohol, heptadecane-1-ol, stearyl alcohol, octadecane-2-ol, eicosane-1-ol, decosane-1-ol, and 6-(perfluoro-7-emthyloctyl)hexanol.

Esters employable in the present invention can be classified into following four categories (a) to (d):

(a) an ester consisting of a monobasic aliphatic acid and an aliphatic or alicyclic monohydric alcohol and having 10 or more carbon atoms in total;

(b) a polybasic acid ester consisting of a bi-/or polybasic carboxylic acid and an aliphatic or alicyclic monohydric alcohol and having 28 or more carbon atoms in total;

(c) an ester consisting of an aliphatic di- or polyhydric alcohol and a monobasic aliphatic acid and having 26 or more carbon atoms in total; and (d) an ester consisting of an aromatic dihydric alcohol and a monobasic fatty acid and having 28 or more carbon atoms in total.

In the above description, the ester (b) mentioned above is effective as the compound (c) in order to conspicuously improve the transparency. The ester (b) alone or a mixed system containing the ester (b) in a ratio of 20% or more and a saturated aliphatic monohydric alcohol and having 10 or more carbon atoms in total is preferable.

Examples of the easter (a) include ethyl caprylate, n-butyl caprylate, n-octyl caprylate, lauryl caprylate, cetyl caprylate, stearyl caprylate, n-butyl caprate, n-hexyl caprate, myristyl caprate, docosyl caprate, methyl laurate, 2-ethylhexyl laurate, n-decyl laurate, stearyl laurate, ethyl myristate, 3-methylbutyl myristate, 2-methylpethyl myristate, n-decyl myristate, cetyl myristate, stearyl myristate, isopropyl palmitate, neopentyl palmitate, n-nonyl palmitate, n-undecyl palmitate, lauryl palmitate, myristyl palmitate, cetyl palmitate, stearyl palmitate, cyclohexyl palmitate, cyclohexylmethyl palmitate, methyl stearate, ethyl stearate, n-propyl stearate, n-butyl stearate, n-amyl stearate, 2-methylbutyl stearate, n-hexyl stearate, n-heptyl stearate, 3,5,5-trimethylhexyl stearate, n-octyl stearate, 2-ethylhexyl stearate, n-nonyl stearate, n-decyl stearate, u-undecyl stearate, lauryl stearate, n-tridecyl stearate, myristyl stearate, n-pentadecyl stearate, cetyl stearate, stearyl stearate, eicosyl stearate, n-docosyl stearate, cyclohexyl stearate, cyclohexylmethyl stearate, oleyl stearate, isostearyl stearate, n-butyl 12-hydroxystearate, n-methyl behenate, n-ethyl behenate, n-propyl behenate, isopropyl behenate, n-butyl behenate, isobutyl behenate, 2-methylbutyl behenate, n-amyl behenate, neopentyl behenate, n-hexyl behenate, 2-methylpentyl behenate, n-heptyl behenate, 2-ethylhexyl behenate, n-nonyl behenate, myristyl behenate, n-undecyl behenate, lauryl behenate, n-tridecyl behenate, myristyl behenate, n-pentadecyl behenate, cetyl behenate, stearyl behenate, and behenyl behenate.

In the following there are shown examples of the polybasic acid esters (b), consisting of an aliphatic di- or polybasic carboxylic acid and an aliphatic or alicyclic monohydric alcohol and having 28 or more carbon atoms in total.

Examples of such esters include dimyristyl oxalate, dicetyl oxalate, dilauryl malonate, dicetyl malonate, distearyl malonate, dilauryl succinate, dimyristyl succinate, dicetyl succinate, distearyl succinate, dilauryl glutarate, diundecyl adipate, dilauryl adipate, di-n-tridecyl adipate, dimyristyl adipate, dicetyl adipate, distearyl adipate, di-n-dicosyl adipate, di-n-decyl azelate, dilauryl axelate, di-n-tridecyl axelate, di-n-nonyl sebacate, dimyristyl sebacate, distearyl sebacate, di-n-pentyl 1,18-octadecylmethylanedicarboxylate, di-n-octyl 1,18-octadecylmethylanedicarboxylate, di-(cyclohexylmethyl) 1,18-octadecylmethylanedicarboxylate, di-neopentyl 1,18-octadecylmethylenedicarboxylate. di-n-hexyl 1,18-octadecylmethylene dicarboxylate, n-heptyl 1,18-octadecylmethylane-diearboxylate, and n-octyl 1,18-octadecylmethylene dicarboxylate.

In the following there are shown examples of the esters (c), consisting of an aliphatic or alicyclic di- or polyhydric alcohol and a monobasic fatty acid and having 26 or more carbon atoms in total.

The examples include ethyleneglycol dimyristate, ethyleneglycol dipalmitate, etyleneglycol distearate, propyleneglycol dilaurate, propyleneglycol dimyristate, propyleneglycol dipalmitete, butyleneglycol distearate, hexyleneglycol dilaurate, hexyleneglycol dimyristate, hexyleneglycol dipalmitate, hexyleneglycol distearate, 1,5-pentanediol distearate, 1,2,6-hexanetriol dimyristate, pentaerythritol trimyristate, pentaerythritol tetralaurate, 1,4-cyclohexanedoil didecyl, 1,4-cyclohexanedoil dimyristyl, 1,4-cyclohexanediol distearyl, 1,4-cyclohexanedimethanol dilaurate, and 1,4-cyclohexanedimethanol dimyristate.

In the following there are shown examples of the esters (d), consisting of an aromatic dihydric alcohol and a monobasic fatty acid and having 28 or more carbon atoms in total.

The examples include xyleneglycol dicaprinate, xyleneglycol di-n-undecanate, xyleneglycol dilaurate, xyleneglycol dimyristate, xyleneglycol dipalmitate, and xyleneglycol distearete.

Ketones to be employed in this invention are those having 10 or more carbon atoms, and examples of such ketones include decane-2-one, undecane-2-one, laurone and stearone.

Carboxylic acids to be employed in this invention are higher fatty acids having 12 or more carbon atoms, and examples of such acids include lauric acid, myristic acid, palmitic acid, stearic acid and behenic acid.

The component (c) is composed of one or more compounds selected form the above-mentioned alcohols, esters, ketones and carboxylic acids. The combined use of plural compounds provides an advantage of increased freedom in setting the trigger temperatures for causing changes in color and transparency.

Then, as a condition for including changes in color and transparency in response to a temperature variation, the ratio of the mutually dissolved three components with respect to the matrix resin is an important factor in the determination of the density in the transparent/opaque change and in the color change.

For example, when the electron-donating color-developing compound (A) and the phenolic compound (B) are respectively used with 3.3 and 13 parts by weight in 100 parts by weight of the matrix resin, stearyl caprate with 28 carbon atoms as the component (C) in an amount of 5 parts by weight provides very low coloring density below the low trigger temperature. On the other hand, if the component (C) is used in an amount of 116 parts by weight, the transparency above the high trigger temperature is reduced so that the composition is practically no longer transparent. For this reason, in order to attain thermochromic change together with color change with a satisfactory contrast, the ratio of addition of the three-component homogeneous used composition is limited, with respect to 100 parts by weight of the matrix resin, 0.8–33 parts by weight of the electron-donating color-developing organic compound (A), 1.6–50 parts by weight of the compound (B) with phenolic hydroxyl radical, and 8–83 parts by weight of the compound (C).

A more preferable range of addition is, with respect to 100 parts by weight of the matrix resin, 1.7–83 parts by weight of the organic compound (A), 3.3–20 parts by weight of the compound (B) with phenolic hydroxyl radical, and 17–50 parts by weight of the component (C).

Further according to the present invention, with respect to 100 parts by weight of the matrix resin, 0.1 to 10 parts by weight, preferably 0.5 to 5 parts by weight of the hindered amine compound selected from the piperidine derivatives are blended.

The above mentioned matrix resin is effective as a satisfactory matrix for a thermochromic material which is extremely different to be subjected to dechlorination reaction of vinyl chloride resin but also practically free from the desensitizing effect of vinyl acetate resin. In the storage at room temperature for a long period of time (2 to 3 months) or the storage at 50° C. or higher for a week or more, an extremely small amount of hydrogen chloride produced from the vinyl chloride monomer system tends to cause a color-developing reaction with leuco dye, and cause irreversible color generation, i.e., remaining color in the uncolored state. However, by blending with the hindered amine compound, the aforesaid defect can be eliminated.

The blending with the compound can stably continue the initial color change characteristics thermally with the lapse of time without practically changing the temperature-color density curve in the non-added system in the initial state.

Conventionally, as means for restraining the occurrence of hydrogen chloride based on free chlorine atoms caused by thermal factor from the vinyl chloride monomer system, various stabilizers are known. The conventional additives were used to simply restrain thermal decomposition of resin.

In the present invention, the occurrence of a small amount of hydrogen chloride further causes a sensitive color-developing reaction with leuco dye, leading to the occurrence of irreversible remaining color. In order to prevent this occurrence, the conventional simple means for restraining decomposition and deterioration should be improved to obtain better effect.

As conventional stabilizers for vinyl chloride resin, there are known phosphate, epoxidized ester, fatty metallic salt, organotin sulfur compound, lead compound, and hindered phenols. Since, however, phosphate and epoxidized ester noticeably affect the sensitivity of color change adversely, they deteriorate the function of thermochromic material. Further if the composition of the present invention is stored in the colored state, the aforesaid components (a) and (b) and these additives locally fusion bond, and as a result, it becomes difficult to extinguish the color.

On the other hand, since organotin compound and lead compound contain heavy metals, their uses are limited from the viewpoint of safety, and they have a great drawback that irreversible color generation is caused from the beginning of addition.

In addition, fatty metallic salt actually could not restrain the reaction of hydrogen chloride produced by thermal decomposition of leuco dye and resin.

The present inventors studied to prevent the irreversible color generation which is caused by hydrogen chloride produced form the leuco dye and the copolymer resin containing vinyl chloride, and as a result, proved the hindered amine compound to be most effective. They completed the present invention by finding that the compound meets all the requirements: not adversely affecting the thermochromic characteristics, that is, not impairing the sensitivity of color change, not lowering the developed color density, maintaining the satisfactory color extinguishing capacity, and the like.

Examples of the aforesaid hindered amine compounds include poly<<6-(N-morpholino)-1,3,5-triazine-2,4-diyl><(2,2,6,6-tetramethyl-4-piperidil)imino>hexamethylene<(2,2,6,6-tetramethyl-4-piperidil)imino>(trade name: SMI-SOLVE 500, manufactured by Sumitomo Chemical Co., Ltd.), 1,2,3,4-butanetetracarboxylic acid tetra(2,2,6,6-tetramethyl-4piperidil) (manufactured by Adeca Argus Co., Ltd.), poly<<6-1, 1,3,3-tetrametylbutyl)imino-1,3,5-triazine-2,4-diyl>(2,2,6,6-tetrametyl-4-piperidil)imino>hexamethylene<(2,2,6,6-tetrametyl-4-piperidil)imino>(trade name: Tinuvin 944-LD, manufactured by Chiba-Geigy), dimethyl succinate-1-(2-hydroxyethyl)-4-hydroxy-2,2,6,6-tetramethylpiperidine polycondensate (Tinuvin 622LD, manufactured by Chiba-Geigy), 2-(3,5-di-t-butyl-4-hydroxybenzyl)-2-n-butyl malonic acid bis(1,2,2,6,6-Pentamethyl-4-piperidil)(Tinuvin 144, manufactured by Chiba-Geigy), N,N-bis(3-aminoporpyl)ethylenediamine-2, 4-bis<N-butyl-N-(1,2,2,6,6-pentametyl-4-piperidil)amino>-6-chloro-1,3,5-triazine condensate, bis(2,2,6,6-tetramethyl-4-piperidil)sebacate (trade name: SANOL LS770, manufactured by Sankyo), bis(N-methyl-2,2,6,6-tetramethyl-4-piperidil) sebacate(trade name: SANOL LS292, manufactured by Sankyo), 4-benzoyloxy-2,2,6,6-tetramethyl-4-piperidine (trade name: SANOL LS-744, manufactured by Sankyo), 8-acetyl-3-dodecyl-7,7,9,9-tetramethyl-1,3,8-triazaspiro<4.5>decane-2, 4-dion (SANOL LS-440, manufactured by Sankyo), 1-<2-<3-(3,5-di-t-butyl-4-hydroxyphenyl)propyonyloxy>-2,2,6,6-tetramethylpiperidine, manufactured by Sankyo), 2,2,4,4-tetrametyl-20-(β-lauryl-oxylcarbonyl)-ethyl-7-oxa-3, 20-diazadispiro (5,1,11,2) heneicosane-21-on(trade name: Sanduvor 3050, manufactured by Sand Co., Ltd.), <N-(2,2,6,6-tetramethyl-4-piperidil)-β-alanine>dodecylester, myristylester mixture (trade name: Sanduvor 3052, manufactured by Sand Co., Ltd.), 5-norbornane-2,3-dicarboxylicacidbis (N-methyl-2,2,6,6-tetramethyl-4-piperidil) ester and the like.

In the following there will be explained the method of preparing the temperature-dependent color-storing resin composition of the present invention. In order to stably attain the most important feature of the present invention, namely changes in color and transparency in response to temperature variation, the three essential components (A), (B) and (C) is preferably dispersed, as already explained before, in a state of small particles of 2.0 μm or less, or in a solid soluble state having no small particle structure, in the matrix resin in a homogeneously fused state.

Usually the matrix resin and the above-mentioned three components are homogeneously dissolved in one or more of the solvents mentioned below, and in this course, a hindered amine compound is added.

In consideration of solubility of the matrix resin containing vinyl chloride-vinyl acetate copolymer, a ketone solvent has to be used as the rich solvent. Such solvent functions as the rich solvent also for the three components.

Examples of such ketone solvent include acetone, methylethylketone, methylisobutylketone, cyclohexanone, methylisopropylketone and methyl-n-propylketone.

Aromatic solvent, functioning as the lean solvent for the matrix resin, is preferably used in combination with the ketone solvent. Examples of such aromatic solvent include toluene and xylene.

Other usable solvents include alcohols such as isopropyl alcohol or n-butanol; esters such as n-ethyl acetate, n-propyl acetate, n-butyl acetate or isobutyl acetate; hydrocarbons such as hexane, cyclohexane, ethylcyclohexane or mineral spirit; and glycol monoalkylether as a diluent or a volatile regulator.

Besides, for uniformly dispersing the mutually dissolved three components in small particles or fixing the same in a solid solution state in the matrix resin, the use of so-called dispersing agent is very effective. Such dispersing agent preferably has small adversary chemical influence on the three components. The compound with such dispersing effect generally reduces the surface tension and interfacial tension significantly, thereby stably fixing the mutual dissolved components in the matrix resin without causing unification and coagulation.

Examples of such compound include siloxane derivatives such as polyether-denatured dimethylpolysiloxane, polyether-denatured methylalkylpolysiloxane, polyester-denatured polydimethylsiloxane or polyester-denatured methylalkylpolysiloxane; fluorinated alkylesters such as Florad FC-430 or FC-431 (manufactured by Sumitomo 3M Co., Ltd.) as fluorinated compound; and special polymers such as acrylonitrile-(2-methacryloyloxyethyl)-trimethylammonium-methyl sulfate-dimethylaminoethyl-methacrylate.

Such additive component is used, calculated on solid content, in an amount of 0.002–0.05% with respect to 100 parts by weight of the resin composition.

The composition of the present invention is dissolved practically uniformly in a suitable combination of the aforementioned solvents, is applied on a substrate for example by spray coating, screen printing, gravure printing, roller coating or reverse roller coating, and the solvents are completely removed by drying at room temperature or under heating. In order to disperse the above-mentioned three components as small particles in the matrix resin or to fix them in a solid solution, through the process of solvent evaporation, the selection of a solvent for solving the composition is an important factor.

More specifically, in the transient period of drying, excessively fast evaporation of solvents results in prevalent precipitation of the component (C) among the three components, and the components are not stably fixed in the matrix resin, thus leading to bleeding phenomenon. Also fast evaporation of the solvents or presence of a large amount of the lean solvent induces fast precipitation of the matrix resin, thereby hindering dispersion of the thermochromic material in uniform small particles or fixation in a solid solution.

In general, the amount of solvents to be used for the composition of the present invention is 1 to 50 parts by weight, preferably 3 to 15 parts by weight, with respect to 1 part by weight of the composition, though the amount varies depending on the coating method.

Thickness of the composition of the present invention is generally within a range of 4 to 100 μm. A thickness below the range tends to show drawbacks of difficulty in obtaining satisfactory contrast.

Usually, the transparency above the high trigger temperature is easily obtained in a system having the thickness of 10 to 35 μm. When the thickness exceeds 50 μm or around, the transparency in the uncolored state has a tendency to gradually decrease.

For uniformly applying the solution of the composition of the present invention physically, there may be added various known additives, such as drip-preventing agent, levelling agent, defamer, viscosifier or friction resistance improving agent. However, such additives should be so selected as to have no or minimum chemical influence to the three components and used in minimum necessary amounts.

If the formed layer of the composition is not physically smooth, not only the appearance but also the transparency above the high trigger temperature are significantly deteriorated due to the random reflection on the surface of the layer. For this reason, the surface smoothness in the formation of the layer of the above-mentioned composition is an important factor in achieving transparency. For this purpose there may be employed various known additives having little chemical influences and capable of providing smoothness.

Also for improving the light fastness and stability of the composition, there may be employed ultraviolet absorbing agent, antioxidant, singlet oxygen extinguisher and other similar stabilizers.

The composition of the present invention is basically colored and opaque below the low trigger temperature and colorless and transparent above the high trigger temperature, but a change between a colored state (1) and a colored state (2) is also possible by the addition of an ordinary dye or an ordinary transparent pigment.

In the following there will be explained the laminate member of the present invention.

The laminate member of the present invention is featured by a laminated structure, on a substrate, of a temperature dependent color/transparency storing resin layer which is composed of dispersion and fixation, as small particles each having a particle size in a range from 0.1 to 2.0 μm, in the vinyl chloride-vinyl acetate copolymer matrix resin, which has been obtained by blending with vinyl chloride-vinyl acetate-vinyliene chloride copolymer of a mutually dissolved material consisting of (A) an electron-donating color-developing organic compound, (B) a compound having a phenolic hydroxyl radical, and (C) a compound selected from alcohols, esters, ketones and carboxylic acids and which is capable of reversible change of transparency together with change in color in response to temperature variation, with a hysteresis with a temperature difference of 10° C. to 50° C. between the high and low trigger temperatures. The laminate member is also featured by a structure in which the transparency exhibited in a temperature range above the high trigger temperature is higher than that exhibited in a temperature range below the low trigger temperature, and a state exhibited in each temperature range above the high trigger temperature or below the low trigger temperature is reversibly stored in a temperature range between the low and high trigger temperatures.

The substrate to be employed in the present invention is basically transparent. However, semi-transparent or opaque substrate can be used according to the application. Examples of the transparent substrate include polyester film (amorphous polyester), polycarbonate, polystyrene, styrene-butadiene block copolymer resin, acrylonitrile-styrene copolymer resin, acrylic resin, methyl methacrylate resin, epoxy resin, polypropylene resin, hard or soft vinyl chloride resin, acrylonitrile-butadiene-styrene copolymer resin (transparent grade) and polypropylene resin.

Examples of the opaque or semi-transparent substrate include medium or low pressure polyethylene, acrylonitrile-butadiene-styrene copolymer resin, nylon, above-mentioned resin colored or opacified with pigment, paper, synthetic paper, fibers, filaments, glass and wood.

The transparency of the composition of the present invention is conspicuously improved in the uncolored state so that various images and colors arranged on the under layer can be made visible. In a system in which a layer made of conventionally-known material is formed as the under layer and having optical properties such as luster, lustrous reflectance, optical interference, brilliance, hologramic property, metallic glass, pearly glass, phosphorescence, and fluorescence, the under layer can be made visible without damaging these properties.

The composition of the present invention is dissolved in solvent and coated as explained before in forming laminated layer on the substrate, and the solvent often dissolves or swells the resin of the substrate, thereby exerting undesirable influences in chemical manner on the thermochromic property of the composition and in physical manner on the transparency thereof. For example, if the present composition dissolved in methylisobutylketone is sprayed on a polystyrene substrate, the solvent dissolves the substrate resin, whereby polystyrene is introduced into the composition. As a result, the thermochromic property of the composition is often influenced chemically. It is therefore preferable to form an undercoat layer on the substrate, prior to the lamination of the composition in order to intercept such chemical influence.

For such undercoating, there is preferred methacrylate resin, which is applied on the substrate employing a solvent composition selected according to the coating method and not attacking the substrate. A more preferable resin is methacrylate resin with the glass transition point at least equal to 80° C., which can be polymethyl methacrylate (Tg: 125° C.), polyisopropyl methacrylate (Tg: 95° C.) or a copolymer resin with the glass transition point at least equal to 80° C.

Also a top coat layer may be laminated on the layer of the above-mentioned composition.

In the formation of such top coated layer, there will not only result a variation in the composition ratio of the the composition but also a significant influence on the thermothromic property transparent/opaque state if the solvent for the top coating re-dissolves the layer of the composition. For this reason, the solvent to be employed in top coating should be practically free from dissolving or swelling of the present composition. Examples of suitable solvent include water, alcohols, glycolethers and aliphatic hydrocarbons.

Examples of resin which is easily soluble or dispersible in such solvent and shows satisfactory adhesion to the matrix resin include methacrylate resin, vinyl-denatured alkyd resin, oil-soluble polyurethane resin, acrylic resin, acrylate copolymer resin and epoxy resin, soluble in the above-mentioned solvents.

In particular, methacrylate or acrylate resin, or copolymer resin thereof, soluble in alcohol or aliphatic hydrocarbon solvent, when dissolved in a solvent composition in which at least 40% is represented by alcohol and/or aliphatic hydrocarbon, can provide a transparent top coat layer with satisfactory coating property and satisfactory adhesion, without undesirable influence on the underlying layer of the present composition.

In the above-mentioned undercoating and top coating, there may be effectively added ultraviolet absorbing agent, antioxidant, singlet oxygen extinguisher, colorant and other optical stabilizers, for the purpose of improving the light fastness of the composition.

Dispersion of the mutually dissolved material of thermochromic components, consisting of the three essential components (A), (B) and (C), in a state of small particles or fixation of the same in a solid solution, in matrix resin of the present invention allows to maintain the components stably without bleeding to the resin surface, thereby achieving reversible change in transparency combined with color change, between a colored transparent state and uncolored transparent state, or between a colored opaque state and a colorless transparent state in response to temperature variation, with large hysteresis and selectively storing each state mentioned above in a temperature range between the high and low trigger temperature reversibly.

The vinyl chloride-vinyl acetate copolymer, and the vinyl chloride-vinyl acetate-vinyl alcohol copolymer and/or the vinyl chloride-vinylidene chloride copolymer serving as the transparency improving agent make a conspicuous contribution to improve the transparency in cooperation.

In this case, by the effect of the hindered amine compound blended in the above-mentioned matrix resin, the repeated thermochromic function can be properly continued without causing remaining color which is liable to occur when the matrix resin is left for a while in the colored state.

DETAILED DESCRIPTION OF THE PREFERRED EMBODIMENTS

[Embodiments]

Figure 1:
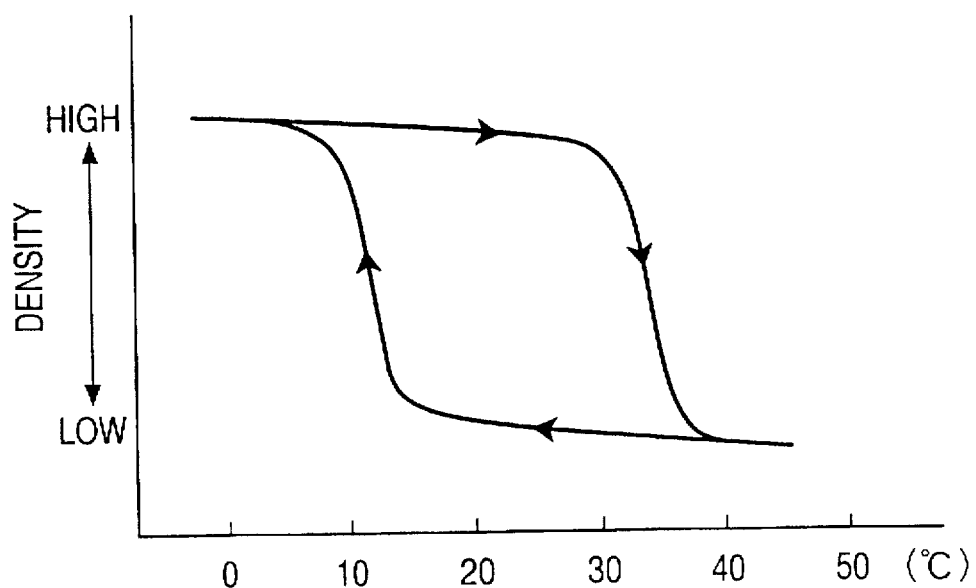
FIG. 1 is a graph showing a relationship between a temperature and a color density of a coated layer of the example 1 to which the temperature-dependent color/transparency storing resin composition of the present invention is applied.

Now the present invention will be clarified in greater details by embodiments thereof, wherein all the amounts are represented by parts by weight. With respect to the width of hysteresis, when the composition is shifted from the transparent or opaque state to the uncolored transparent state and is then cooled to the low temperature side, the width becomes smaller if the heated temperature is in the vicinity of and not exceeding the high trigger temperature is in the vicinity of and not exceeding the high trigger temperature. The width of hysteresis mentioned in the present invention refers to the maximum width in a specific one composition.

The color change temperature, absorbance and haze value in the following examples were measured in the following manner.

(1) Color change temperature:

In each of examples 1 to 4, a specimen for measurement was prepared by adhering white synthetic paper of a thickness of 60 μm to the rear face of a polyethylene terephthalate film coated with the present composition. The specimen was adhered, further with a two-sided adhesive tape, onto the bottom face of a heat/cooling container, and was so set that the composition faces the light source of a color difference meter (model TC-3600 manufactured by Tokyo Denshoku Co., Ltd.). Water was placed in the container, then cooling (from 50° C. to 0° C.) and heating (from 0° C. to 50° C.) at a rate of 10° C./minute were conducted as a cycle, and the luminosity of the specimen was plotted at different temperatures.

(2) Absorbance:

Absorbance (reflective) was measured in a wavelength range of 400 to 700 nm by a spectrophotometer (autorecording spectrophotometer model U-3210 manufactured by Hitachi Co., Ltd.), with a printed article of the composition prepared in each example set at the sample side, and with a polyethylene terephthalate film, same as used in the example, set at the reference side.

The measurement was conducted at 20° C., in the colored opaque state and in the uncolored transparent state.

In the attached drawings, solid lines indicate the absorbance at 20° C. in the colored opaque state, and broken lines indicate those at 20° C. in the uncolored transparent state.

(3) Haze value:

Haze value was measured with a printed article of the composition prepared in each example in the colored state and in the uncolored state by a color difference haze measuring apparatus (COH-300A manufactured by Nippon Denshoku Co., Ltd.).

EXAMPLE 1

4 parts of 1,2-benz-6-dibutylaminofluorane, 5 parts of 1,1-bis(4'-hydroxyphenyl)hexane, 4 parts of cetylalcohol, 4 parts of stearylalcohol, 7 parts of dimyristyl malonate, 45 parts of VYHH (vinyl chloride-vinyl acetate copolymer (86:14) resin, manufactured by Union Carbide Japan Co., Ltd.), and 15 parts of 1000GKT (vinyl chloride-vinyl acetate-vinyl alcohol copolymer (91:30:6) resin manufactured by Denki Kagaku Kogyo Co., Ltd.) were dissolved in 240 parts of MIBK (methyl ethyl ketone).

Then 0.2 parts of Byk-310 (polyester-denatured dimethylpolysiloxane, manufactured by Byk Chemie) and 1 part of piperidine derivative (trade name SANOL LS770, manufactured by Sankyo Co., Ltd.) were added, whereby ink (A) was obtained.

The above-mentioned ink (A) was applied with an applicator to coat a PET film (100 μm thick, trade name NF PET TOUMEI 100[A], manufactured by Rintek Co., Ltd.) so as to obtain a dried film thickness of about 25 μm, and dried at 80° C. for 30 minutes to obtain a printed article of the composition according to the present invention.

Thus obtained printed article showed a low trigger temperature of about 13° C. and a high trigger temperature of about 37° C., with a width of hysteresis of about 24° C. The article became colorless and transparent above the high trigger temperature, showing a haze value of 9.1%, and became pink below the low trigger temperature, showing a haze value of 18.2%.

The above-mentioned two states could be assumed selectively, within a range between the high and low trigger temperatures.

In other words, a state which was obtained above the above-mentioned high trigger temperature or a state which was obtained below the low trigger temperature was stored in a temperature range between the two trigger temperatures after the heat or the cool heat required for each change was removed.

The above-mentioned change could be stably repeated even after 500 cycles, without bleeding or other undesirable effect. Also similar change and stability could be confirmed after standing for one week in a thermostat chamber of 60° C.

Figure 2:
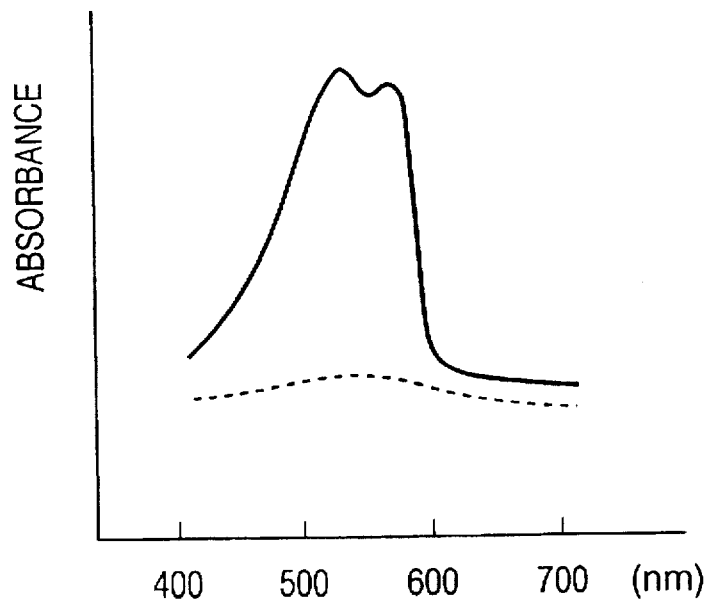
FIG. 2 is a graph showing absorbance curves of the coated layer of the example 1 in the colored state and in the uncolored state, in which the solid line indicates the absorbance in the colored state while the dotted line indicates the absorbance in the uncolored state.

The color change curve and the absorbance curve of the printed article are respectively shown in FIGS. 1 and 2.

EXAMPLE 2

2 parts of 3-cyclohexylamino-6-chlorofluorane, 5 parts of 1,1-bis(4'-hydroxyphenyl)octane, 15 parts of dimyristyl glutarate, 40 parts of VYH(vinyl chloride-vinyl acetate copolymer (86:14) resin, manufactured by Union Carbide Japan Co., Ltd.), 20 parts of Denkavinyl 1000MTS (vinyl chloride-vinyl acetate copolymer (70:30) resin, manufactured by Denki Kagaku Kogyo Co., Ltd.) were dissolved in MIBK. Then 0.2 parts of Byk-325 (polyether-denatured dimethylpolysiloxane, manufactured by Byk Chemie) and 1 parts of piperidine derivative (trade name: SANOL LS770, manufactured by Sankyo Co., Ltd.) were added, whereby the ink (B) was obtained.

The above-mentioned ink (B) was applied with an applicator to coat a PET film (100 μm thick, trade name NF PET TOUMEI 100[A], manufactured by Rintek Co., Ltd.) so as to obtain a dried film thickness of about 25 μm, and dried at 80° C. for 30 minutes to obtain the printed article of the composition of the present invention.

Thus obtained printed article showed a low trigger temperature of ca. 0° C. and a high trigger temperature of ca. 45° C., with a width of hysteresis of ca. 45° C. The article became colorless and transparent above the 10 high trigger temperature, showing a haze value of 26.9%, and became orange and opaque below the low trigger temperature, showing a haze value of 43.5%. The above-mentioned two states could be selectively assumed, within a range between the high and low trigger temperatures.

The above-mentioned change could be stably repeated even after 500 cycles, without bleeding or other undesirable effects. Also similar change and stability could be confirmed after standing for one week in a thermostat chamber of 60° C.

Figure 3:
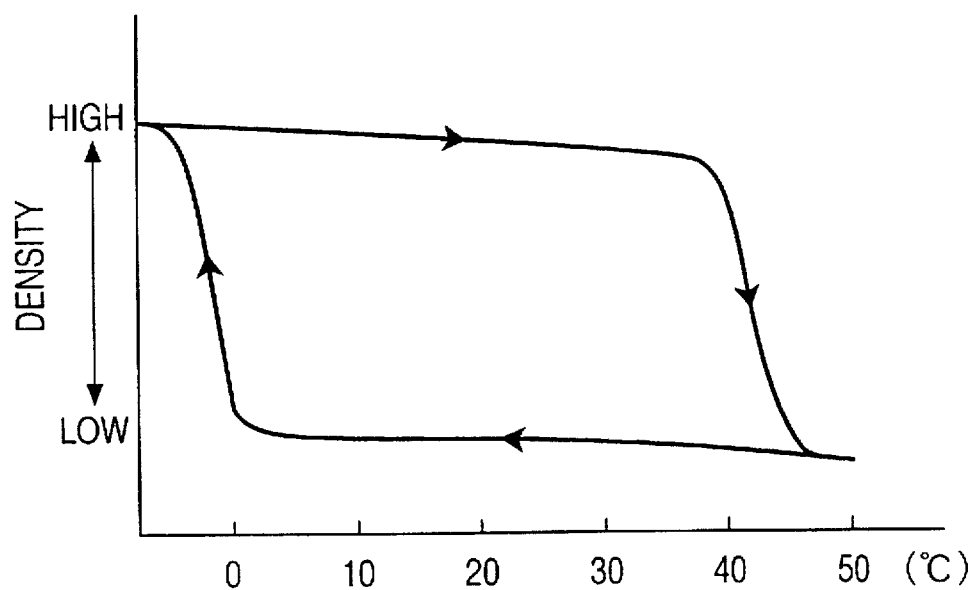
FIG. 3 is a graph showing a relationship between a temperature and a color density of a coated layer of the example 2.
Figure 4:
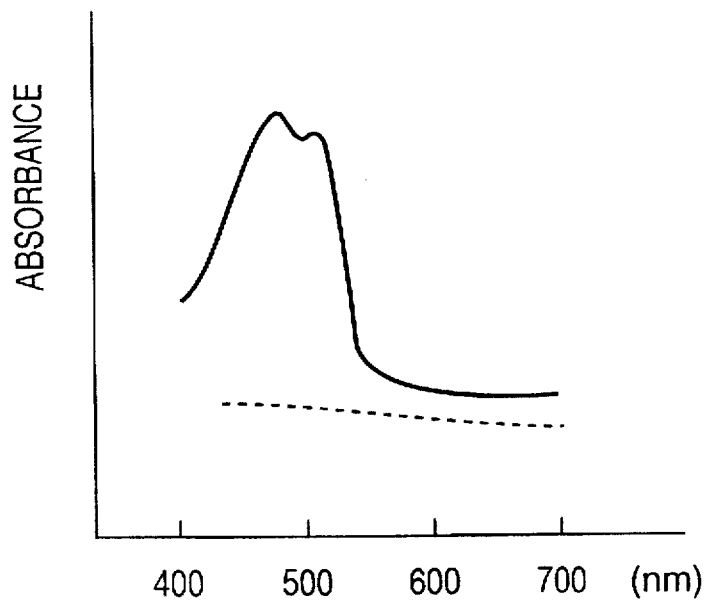
FIG. 4 is a graph showing absorbance curves of the coated layer of the example 2 in the colored state and in the uncolored state, in which the solid line indicates the absorbance in the colored state while the dotted line indicates the absorbance in the uncolored state.

The color change curve and the absorbance curve of the printed article are respectively shown in FIGS. 3 and 4.

EXAMPLE 3

1.5 parts of 2-phenyl-6-(N-ethyl-N-hexylamino)fluorane, 8 parts of 2,2-bis(4'-hydroxyphenyl)decane, 20 parts of di-n-hexyl octametyl dicarboxylate, 30 parts of VYHH (vinyl chloride-vinyl acetate copolymer (86:14) resin, manufactured by Union Carbide Japan Co., Ltd.), and 30 parts of VAGH(vinyl-chloride-vinyl acetate-vinyl alcohol copolymer (90:4:6) resin, manufactured by Union Carbide Japan Co., Ltd.) were dissolved in 240 parts of MIBK. Then, 0.2 parts of Byk-300 (polyester-denatured dimethylpolysiloxane, manufactured by Byk Chemie) and 1 part of piperidine derivative (trade name SANOL LS770, manufactured by Sankyo Co., Ltd.) were added, whereby the ink (C) was obtained.

The above-mentioned ink (C) was applied with an applicator to coat a PET film (100 μm thick, trade name NF PET TOUMEI 100[A], manufactured by Rintek Co., Ltd.) so as to obtain a dried film thickness of about 25 μm, and dried at 80° C. for 30 minutes to obtain a printed article of the composition of the present invention.

Thus obtained printed article showed a low trigger temperature of ca. 13° C. and a high trigger temperature of ca. 36° C., with a width of hysteresis of ca. 23° C. The article became colorless and transparent about the high trigger temperature, showing a haze value of 15.7%, and became green and opaque below the low trigger temperature, showing a haze value of 25.3%. The above-mentioned two states could be selectively assumed, within a range between the high and low trigger temperatures.

The above-mentioned change could be stably repeated even after 500 cycles, without bleeding or other undesirable effects. Also similar change and stability could be confirmed after standing for one week in a thermostat chamber of 60° C.

Figure 5:
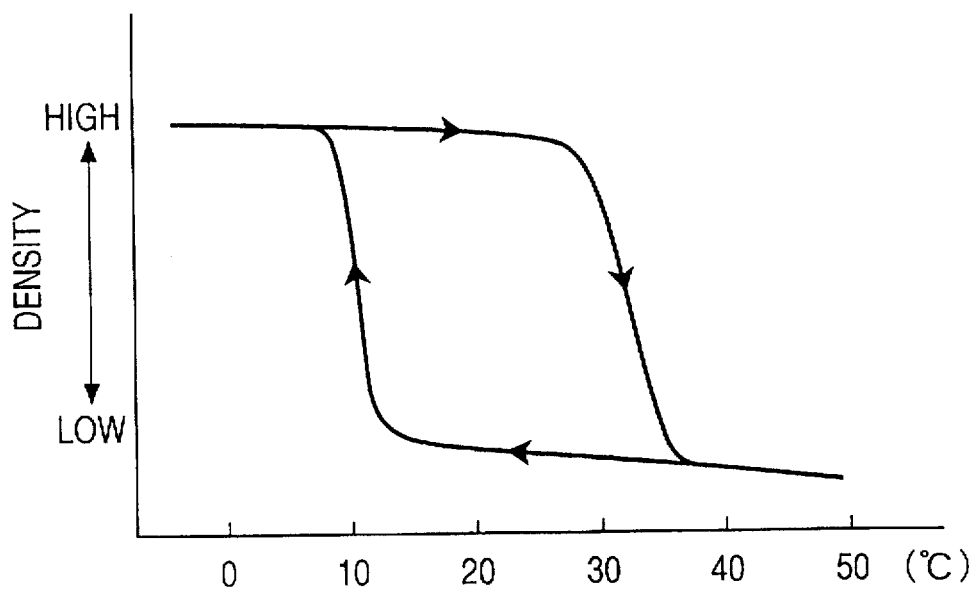
FIG. 5 is a graph showing a relationship between a temperature and a color density of a coated layer of the example 3.
Figure 6:
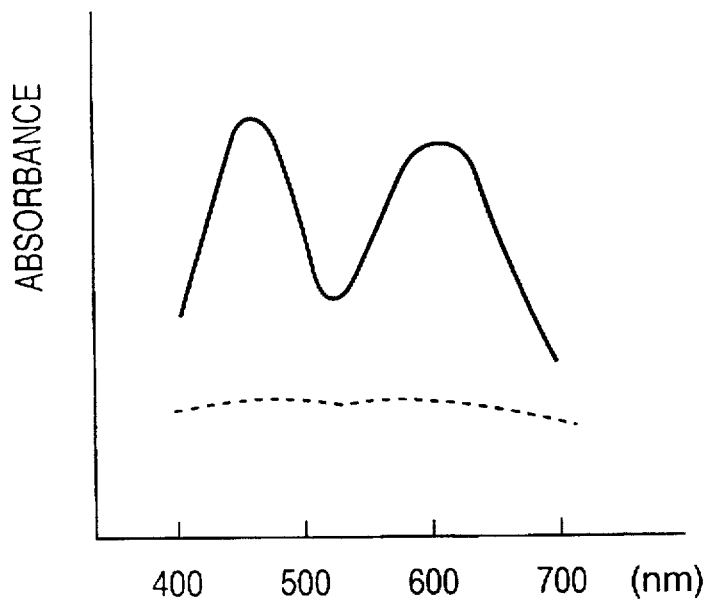
FIG. 6 is a graph showing absorbance curves of the coated layer of the example 3 in the colored state and in the uncolored state, in which the solid line indicates the absorbance in the colored state while the dotted line indicates the absorbance in the uncolored state.

The color change curve and the absorbance curve of the printed article, the absorbance are respectively shown in FIGS. 5 and 6.

EXAMPLE 4

2 parts of 2-chloro-3-methyl-6-diethylaminofluorane, 5 parts of 2,2-bis(4'-hydroxyphenyl) propane and 15 parts of cetylalcohol, 30 parts of VYHH (vinyl-chloride-vinyl acetatecopolymer (86:14) resin, manufactured by Union Carbide Japan Co., Ltd), and 30 parts of Denkavinyl 1000GKT (vinyl chloride-vinyl acetate-vinyl alcohol copolymer (91:3:6) resin, manufactured by Denki Kagaku Kogyo Co., Ltd) were dissolved in 240 parts of solution of MIBK.

Then 0.2 parts of Byk-300 (polyester-denatured dimethylpolysiloxane, manufactured by Byk Chemie) and 1 part of piperidine derivative (trade name: SANOL LS740 manufactured by Sankyo Co., Ltd) were added, whereby the ink (D) was obtained.

The above-mentioned ink (D) was applied with an applicator to coat a PET film (100 μm thick, trade name NF PET TOUMEI 100 [A], manufactured by Rintek Co., Ltd.) so as to obtain a dried film thickness of about 25 μm, and dried at 80° C. for 30 minutes to obtain a thermochromic opaque printed article.

Thus obtained printed article showed a low trigger temperature of about 20° C. and a high trigger temperature of about 43° C., with a width of hysteresis of about 23° C. The article became colorless and transparent above the high trigger temperature showing a haze value of 34.7% and became vermilion and opaque below the low trigger temperature, showing a haze value of 69.6%. The above-mentioned two states could be selectively assumed, within a range between the high and low trigger temperatures.

The above-mentioned change could be stably repeated even after 500 cycles, without bleeding or other undesirable effects. Also similar change and stability could be confirmed after standing for one week in a thermostat chamber of 60° C.

Figure 7:
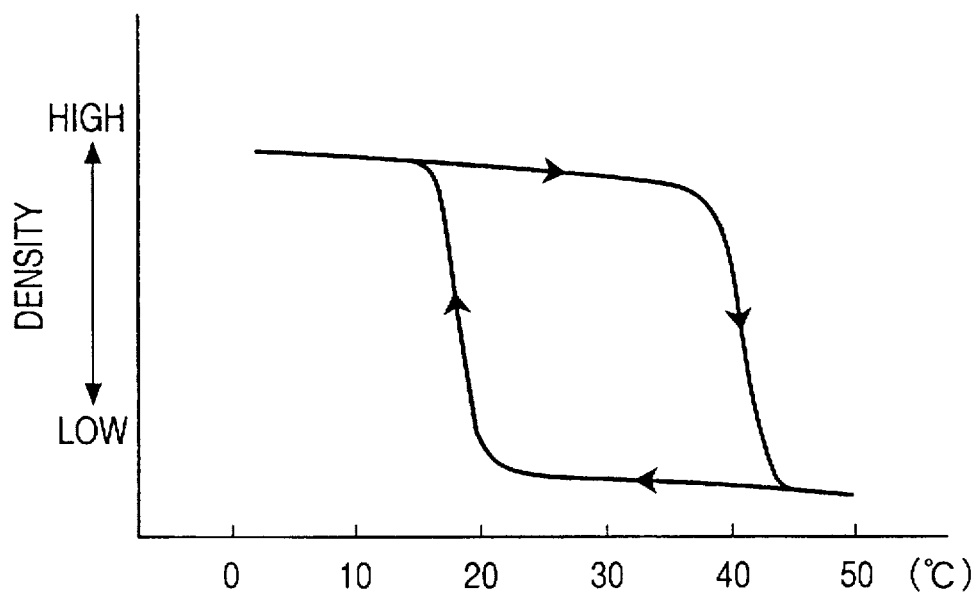
FIG. 7 is a graph showing a relationship between a temperature and a color density of a coated layer of the example 4.
Figure 8:
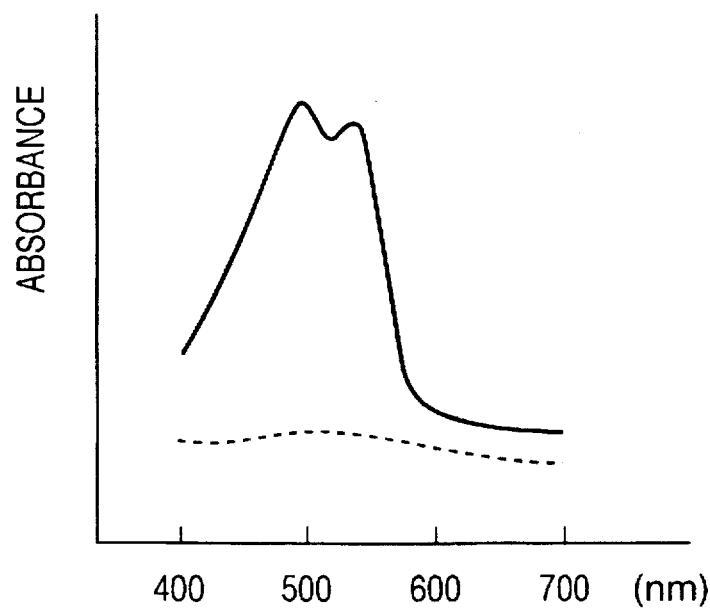
FIG. 8 is a graph showing absorbance curves of the coated layer of the example 4 in the colored state and in the uncolored state, in which the solid line indicates the absorbance in the colored state while the dotted line indicates the absorbance in the uncolored state.
Figure 9:
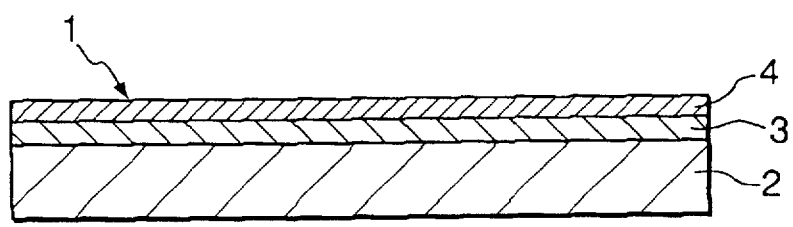
FIG. 9 is a cross-sectional view for longitudinally showing an example of the laminate member according to the present invention.

The color change curve and the absorbance curve of the printed article are respectively shown in FIGS. 7 and 8.

Application 1 Thermochromic Imitation Jewelry:

[1] Ink preparation:

(1) Undercoat ink:

Undercoat ink (a) was prepared by dissolving 10 parts of Acrypet VK (methyl methacrylate resin manufactured by Mitsubishi Rayon Co., Ltd.) in 60 parts of MIBK and 30 parts of propyleneglycol monomethylether.

(2) Ink containing the composition of the present invention:

This ink was prepared by mixing 300 parts of the ink (A) of the example 1 with 250 parts of MIBK and 50 parts of cyclohexanone.

(3) Topcoat ink:

Topcoat ink was prepared by dissolving 20 parts of Plus-size CB-2 (alcohol-soluble acrylic resin, in 50% ethanolic solution, manufactured by Go-oh Chemical Co., Ltd.) and 0.5 parts of Tinuvin 328 (ultraviolet absorbing agent manufactured by Ciba-Geigy) in 50 parts of isopropanol and 30 parts of n-butanol.

[2] Preparation of laminate member:

On the external surface of an imitation jewelry made of methyl methacrylate resin backed with aluminum by hot stamping, the undercoat ink (a) was sprayed and dried at 80° C. for 30 minutes. The obtained undercoat layer had a dried thickness of about 5 μm.

Then the containing the composition of the present invention was sprayed thereon and dried at 80° C. for 30 minutes. The obtained ink layer had a dried thickness of about 15 μm.

Then the topcoat ink was applied as the protective layer. The obtained topcoat layer had a dried thickness of about 10 μm.

Thus obtained imitation jewelry changes its state with a low trigger temperature of about 13° C. and a high trigger temperature of about 37° C.

Thus prepared molded article, when immersed in iced water of 5° C., became pink and transparent, whereby the underlaying aluminum glossy layer could be viewed. When immersed in warm water of 50° C., it became colorless and transparent imitation jewelry. Similar change could be confirmed after 500 cycles of the change.

Application 2 Thermochromic mirror:

[1] Ink preparation:

(1) Ink containing the composition of the present invention:

This ink was prepared by mixing 300 parts of the ink of the example 2 with 250 parts of MIBK and 50 parts of cyclohexanone.

(2) Topcoat ink:

Topcoat ink was prepared by dissolving 10 parts of Dianal BR-102 (alcohol soluble acrylic resin, manufactured by Mitsubishi Rayon Co., Ltd.) and 1 part of Tinuvin PS (ultraviolet absorbing agent, manufactured by Ciba-Geigy) in 60 parts of isopropyl alcohol and 30 parts of n-butanol.

[3] Preparation of laminate member:

On the external surface of a mirror made of methyl methacrylate resin deposited with aluminum by evaporation, the ink containing the composition of the present invention mentioned above was applied to be processed in the same manner as in the application 1, thereby forming a layer having the thickness of about 15 μm. Then, a topcoat layer having the thickness of about 10 μm was formed by the above-mentioned topcoat ink.

Thus obtained thermochromic mirror, when placed in a freezer of −5° C., instantly became vermilion, whereby the glassy layer of aluminum could be slightly viewed. Then, when immersed in warm water of 50° C., the mirror became colorless and transparent. Also the above-mentioned change could be confirmed even after 500 cycles.

Application 3 Thermochromic Hologram Display Member:

[1] Ink preparation:

(1) Ink containing the composition of the present invention:

The ink of the example 3 was used as this ink.

(2) Undercoat ink:

Undercoat ink was obtained by dissolving 20 parts of Dianal BR-85 (methyl methacrylate resin, manufactured by Mitsubishi Rayon Co., Ltd.) in 80 parts of MIBK.

(3) Topcoat ink:

Topcoat ink was obtained by dissolving 70 parts of Acrydic A-188 (turpene-soluble acrylic resin, manufactured by Dai-Nippon Ink Co., Ltd.) in 30 parts of mineral turpene.

(4) Preparation of laminate member:

On the external surface of a hologramic film (trade name: HOLOGRASTER 101 Surf Whisper, manufactured by Rintek Co., Ltd.), the above-mentioned undercoat ink was applied with an applicator so as to obtain a dried film thickness of about 5 μm. Then, the ink of the example 3 is applied in the same manner so as to obtain a film thickness of about 15 μm.

Thus obtained laminate member showed a low trigger temperature of about 13° C. and a high trigger temperature of about 36° C., and became green below the low trigger temperature and is uncolored above the high trigger temperature. In each of the above-mentioned states, the underlaying hologramic image and brilliance were viewed. The above-mentioned state change could be confirmed even after 500 cycles.

Comparative Example 1

A sample piece was prepared with the same compositions and in the same manner as in the example 1, except that 45 parts of VYHH and 15 parts of 1000GKT were replaced by 60 parts of VYHH. Thus obtained sample piece showed the same color change as in the example 1, except that it showed a haze value of 78.9% at a temperature below the low trigger temperature and a haze value of 49.4% at a temperature above the high trigger temperature.

Comparative Example 2

A sample piece was prepared with the same compositions and in the same manner as in the example 2, except that 40 parts of VYHH and 20 parts of 1000W were replaced by 60 parts of VYHH. Thus obtained sample piece showed the same color change as in the example 2, except that it showed a haze value of 86.2% at a temperature below the low trigger temperature and a haze value of 54.2% at a temperature above the high trigger temperature.

Comparative Example 3

A sample piece was prepared with the same compositions and in the same manner as in the example 3, except that 30 parts of VYHH and 30 parts of VAGH were replaced by 60 parts of VYHH. Thus obtained sample piece showed the same color change as in the example 3, except that it showed a haze value of 72.4% at a temperature below the low trigger temperature and a haze value of 46.5% at a temperature above the high trigger temperature.

Comparative Example 4

A sample piece was prepared with the same compositions and in the same manner as in the example 4, except that 30 parts of VYHH and 30 parts of 1000GKT were replaced by 60 parts of VYHH. Thus obtained sample piece showed the same color change as in the example 4, except that it showed a haze value of 81.6% at a temperature below the low trigger temperature and a haze value of 49.0% at a temperature above the high trigger temperature.

Next, a change state in the transparency due to a relationship between components and a ratio of mixture thereof in the matrix resin of the present invention were tested by the following test method.

Test method:

2 parts of 2-(3'-trifluoromethylphenyl) amino-6-diethylaminofluorane, 5 parts of 2,2'-(4'-hydroxyphenyl) propane, 4 parts of cetyl alcohol, 4 parts of stearyl alcohol, 7 parts of dimyristyl malonate, 1 part of LS-700 (piperidine derivative, manufactured by Sankyo Co., Ltd.), and 0.2 parts of Byk-300 (leveling agent, manufactured by Byk Chemie) were uniformly dissolved in 300 parts of 20% solution of MIBK of the matrix resin, and then were applied with an applicator on a transparent PET film having the thickness of 100 μm, so as to form a dried film having the thickness of about 25 μm. The haze value of thus obtained sample piece was measured in the same manner as in the foregoing examples.

Results of the measurement are shown in Tables 1 and 2.

TABLE 1

| mixed amount (part) | | Haze value (%) | |
|---|---|---|---|
| VYHH | 1000 GKT | In the colored state | In the uncolored state |
| 60 | 0 | 78.1 | 49.4 |
| 50 | 10 | 35.5 | 21.4 |
| 45 | 15 | 18.2 | 9.1 |
| 40 | 20 | 18.1 | 9.5 |
| 30 | 30 | 18.5 | 10.2 |
| 20 | 40 | 18.4 | 10.0 |
| 10 | 50 | The component (C) is separated inside and uniform color change can not be viewed. | |
| 0 | 60 | | |

TABLE 2

| mixed amount (part) | | Haze value (%) | |
|---|---|---|---|
| VYHH | 1000 W | In the colored state | In the uncolored state |
| 60 | 0 | 78.1 | 49.4 |
| 50 | 10 | 65.3 | 30.2 |
| 45 | 15 | 48.3 | 20.0 |

TABLE 2-continued

| mixed amount (part) | | Haze value (%) | |
|---|---|---|---|
| VYHH | 1000 W | In the colored state | In the uncolored state |
| 40 | 20 | 49.2 | 18.0 |
| 30 | 30 | 50.6 | 18.5 |
| 20 | 40 | 49.3 | 19.1 |
| 10 | 50 | The component (C) is separated inside and uniform color change can not be viewed. | |
| 0 | 60 | | |

The temperature-dependent color/transparency storing resin composition of the present invention is obtained by fixing a mutually dissolved composition of thermochromic elements composed of three essential components, in a dispersed state as small particles or in a solid soluble state, in a matrix resin, and is capable of exhibiting reversible change in color and transparency in response to temperature variation with large hysteresis, and storing both states reversibly before and after the change in a temperature range between low and high trigger temperatures. On this occasion, since the termochromic elements and the matrix resin are properly combined, it is clear that a response caused by a temperature variation can properly function permanently and the transparency in the uncolored state is remarkably improved. As a result, the effect of revealing the interior in the uncolored state can be satisfied.

Therefore, in a system in which a layer printed or coated with the resin composition mentioned above, a condition of an under layer can be clearly seen through, which satisfies various practical demands, combined with the thermochromic effect.

Particularly, with the composition of the present invention, a variety of combinations of a change in color and a change in transparency can be selected. The composition is also capable of reversible change between the colored state (1) and the colored state (2) depending on a mixed ratio of dye or transparent pigment, in addition to reversible change between the colored transparent state and the colorless transparent state, or a reversible change between the colored opaque state and the colorless transparent state.

Thus, composition of the present invention is applicable to toys, stationeries, miscellaneous goods, daily necessaries, teaching aids, interior goods, decorative goods, recording paper or the like for automated office equipment, etc., in wide industrial fields. Applications of the present invention is not limited to those described below. However, specific applications are enumerated in the following in order to clarify the effect of the present invention.

In toys, the composition having the colored opaque state or the colorless transparent state is laminated on the surface of a solid object or three dimensional article which is molded of a transparent material, and the interior or contents of the object or article can be concealed or revealed (seen through). Applications are as follows.

1) It is possible to conceal and/or reveal the structure of an engine or the like inside the hood of a miniature car which is molded of transparent resin by coloring and laminating the composition on the components of the hood;

2) By coloring and laminating the composition on the fuselage of an aircraft which is molded of transparent resin, it is possible to conceal and/or reveal the internal structure of the fuselage or the movements of the crews and passengers (which means that they can be revealed by heating and return to their original concealed state by cooling repeatedly).

3) By coloring and laminating the position on a transparent member on the chest of a toy robot, it is possible to conceal and/or reveal the mechanical and electronic structures in the vicinity of the chest of the robot.

4) By coloring and laminating the composition on the front part of the body of a doll molded of transparent resin, it is possible to conceal and/or reveal gems, a fetus, or the like, contained inside the doll.

5) By coating and laminating the composition in a multicolored egg pattern on the entire surface of a transparent globular plastic object, it is possible to conceal and/or reveal a bird, dinosaur, etc., inside the egg.

6) By coating the whole surface of a magic lamp molded by transparent resin with the composition in many colors and rubbing the lamp, it is possible to conceal and/or reveal gold coins or a jinn inside the lamp.

On the other hand, more effective applications are possible in the field of toys when the composition having the colored transparent and/or colorless transparent state is combined with a material having the optical properties such as luster, metallic gloss, pearly gloss, etc., depending on the feature of the composition of maintaining the transparent state all the time before and after the thermochromic change. The applications in the field of toys enumerated in the following can be also effective in the field of goods of practical use.

1) It is possible to change a mirror of rainbow-color into an ordinary colorless mirror, by coloring the reflecting surface of the mirror with the composition in many colors. When the mirror is rainbow-colored, it is difficult to visibly confirm a reflection in the mirror due to the camouflaging effect of the pattern caused by the many colors. However, in a state in which the colors are erased by heating, the reflection can be clearly obtained as in an ordinary mirror.

2) When the composition is used to back transparent precious stones onto which aluminum foil is stamped or onto which aluminum is deposited by evaporation, it becomes possible to change the colors of the precious stones from ruby to diamond, emerald to topaz, and amethyst to aquamarine, and at the same time, to maintain the transparency even before and after the color change.

3) When lustrous ornaments such as a crown, ear rings, a brooch, or the like which have been colored to gold or silver by deposition are sprayed with the composition to be colored, it is possible to select two colors before and after the color change upon request while maintaining the metallic luster. For example, by laminating the composition of the present invention having orange color on a crown which has been colored to be silver toned, it is possible to select the state of silver color by heating and the state of gold color by cooling.

4) In the same manner, by laminating the composition of the present invention on a material having the holographic effect, it is possible to change the color of the material while maintaining the holographic effect. When the present invention is applied to applied to stationeries, by molding, for example, the barrel portion or the cap of a pen or a ballpoint pen with a transparent resin and laminating the composition having the colored opaque state and/or colorless transparent state onto the molded resin, it is possible to confirm a residual amount of the ink or visually confirm interior mechanism upon request.

Next, when the present invention is applied to the fields of miscellaneous goods and daily necessaries, the composition having the colored transparent and/or colorless transparent state is laminated on sunglasses or a sun visor so as to change or select the color thereof without damaging the revealing function. As a result, the fashonability can be improved.

With respect to teaching aids, it is possible to conceal/ reveal the internal frame or internal organs of an anatomical model of the human body, an animal, or an insect, by using the composition having the colored opaque and/or colorless transparent state. Therefore, the composition can be effectively used in educational materials. In this case, by laminating the composition of the present invention having the colored opaque and/or colorless transparent state only on a portion having answers, it is possible to refer to a corresponding answer when needed.

In the field of interior goods, by coloring a transparent acrylic plate with the composition having the colored transparent and/or colorless transparent state in many colors, it is possible to select upon request two kinds of patterns, that is, an ordinary colorless glass pattern and a stained glass pattern.

Since the composition having the colored transparent and/or colorless transparent state is more effective when applied to decorative goods, and it is possible to select the colors of decorative goods such as ear rings, precious stones, rings, necklaces, brooches, etc., without damaging the brilliance thereof.

On the other hand, the composition of the present invention can be applied to output recording paper for automated office computer-related equipment. That is, with this composition, images on the paper can be developed by printing or drawing with a thermal pen, a heat pen, or a cool pen. Further, the paper can be returned to its original state with no recorded images when cooled or heated upon request so that the paper can be effectively used as rewritable recording material.

Also, when the composition having the colored opaque and/or colorless transparent state is laminated on a transparent film for an overhead projector, since a written or drawn portion in the colored opaque state has a poor light transmittance, images of characters and figures are generated as shadows on the screen. Since a portion not written or drawn is in the transparent state, it is projected onto the screen as a highlighted portion. As a result, such film can be used as a useful recording material which is provided with the writable function, in addition to the functions of an ordinary film for an overhead projector.

What is claimed is:

1. A temperature-dependent color/transparency storing resin composition which is composed by dispersing and fixing small particles of a mutually dissolved homogeneous composition comprising (A) an electron-donating color-developing organic compound, (B) a compound having a phenolic hydroxyl radical and (C) a compound selected from the group consisting of alcohols, esters, ketones and carboxylic acids, in vinyl chloride-vinyl acetate-copolymer matrix resin, and capable of exhibiting reversible change in color and in transparency in response to a temperature variation with hysteresis with a temperature difference of 10° C. to 50° C. between the low trigger temperature and the high trigger temperature, having the transparency exhibited above the high trigger temperature higher than that exhibited below the low trigger temperature, and reversibly storing a state developed above said high trigger temperature and a state developed below said low trigger temperature in a temperature range between the high and low trigger temperatures, wherein the transparency thereof is improved by blending vinyl chloride-vinyl acetate-vinyl alcohol copolymer and/or vinyl chloride-vinylidene chloride copolymer in a ratio of 10 to 70% by weight with said vinyl chloride-vinyl acetate copolymer as an agent to improve the transparency in said matrix resin.

2. A temperature-dependent color/transparency storing resin composition according to claim 1, wherein the haze value thereof in a temperature range above the high trigger temperature has a value not more than 35%.

3. A temperature-dependent color/transparency storing resin composition according to claim 1, wherein any state changed in each temperature range below the low trigger temperature or above the high trigger temperature shows a haze value of not more than 35%.

4. A temperature-dependent color/transparency storing resin composition according to claim 1, composed with a ratio, with respect to 100 parts by weight of said matrix resin, of hindered amine compound containing piperidine moiety within a range of 0.1 to 10 parts by weight, (A) the electron-donating color-developing organic compound within a range of 0.8 to 33 parts by weight, (B) the compound having a phenolic hydroxyl radical within a range of 1.6 to 50 parts by weight, and (C) the compound selected from the group consisting of alcohols, esters, ketones and carboxylic acids within a range of 8 to 83 parts by weight.

5. A temperature-dependent color/transparency storing resin composition according to claim 1, wherein the vinyl chloride-vinyl acetate-copolymer of said matrix resin has a number average molecular weight within a range from 7,000 to 50,000, and has a constituent monomer ratio of vinyl chloride within a range of 60 to 92% and vinyl acetate within a range of 8 to 40%, said vinyl chloride-vinyl acetate-vinyl alcohol copolymer has a number average molecular weight within a range from 7,000 to 50,000, and has a constituent monomer ratio of vinyl chloride within a range of 70 to 92%, vinyl acetate within a range of 1 to 10%, and vinyl alcohol within a range of 4 to 20%, and said vinyl chloride-vinylidene chloride copolymer has a number average molecular weight within a range from 7,000 to 50,000, and has a constituent monomer ratio of vinyl chloride within a range of 70 to 90% and vinylidene chloride within a range of 10 to 30%.

6. A temperature-dependent color/transparency storing resin composition according to claim 1, further comprising, with respect to total amount of said composition, a dispersing agent in a ratio of 0.002 to 0.5% by weight, in addition.

7. A temperature-dependent color/transparency storing resin composition according to claim 1, wherein at least 50% by weight of the compound having phenolic hydroxyl radical is selected from the compound represented by the following general formula:

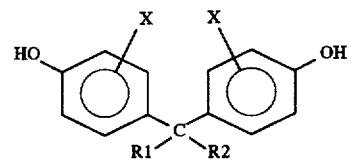

wherein R1 stands for H or $CH_3$, R2 stands for $C_nH_{2n+1}$ (4<n<11), which is a straight-chain or branched chain alkyl radical, or R1=R2=$CF_3$, and X stands for a substituent which is H or $CH_3$, or halogen, on the aromatic ring.

8. A temperature-dependent color/transparency storing resin composition according to claim 1, wherein said component (C) is one or more compounds selected from (a) esters each consisting of a monobasic fatty acid and an aliphatic or alicyclic monohydric alcohol and having 10 or more carbon atoms in total, (b) polybasic acid esters each consisting of an aliphatic di- or polybasic carboxylic acid and an aliphatic or alicyclic monohydric alcohol and having 28 or more carbon atoms in total, (c) esters each consisting of an aliphatic di- or polyhydric alcohol and a monobasic fatty acid and having 26 or more carbon atoms in total, (d) esters each consisting of an aromatic dihydric alcohol and a monobasic fatty acid and having 28 or more carbon atoms in total, and (e) saturated aliphatic monohydric alcohols each having 10 or more carbon atoms in total.

9. A temperature-dependent color/transparency storing resin composition according to claim 1, wherein one or more polybasic acid esters each consisting of an aliphatic di- or polybasic carboxylic acid and an aliphatic or alicyclic monohydric alcohol and having 28 or more carbon atoms in total, or a mixed system containing one ore more polybasic acid esters each consisting of an aliphatic di- or polybasic carboxylic acid and an aliphatic or alicyclic monohydric alcohol and having 28 or more carbon atoms in total in a ratio of 20% or more and one of more saturated aliphatic monohydric alcohols each having 10 or more carbon atoms in total is used as said component (C).

10. A laminate member comprising, on a substrate, a temperature-dependent color/transparency storing resin layer which is composed by dispersing and fixing particles of a mutually dissolved homogeneous composition comprising (A) an electron-donating color-developing organic compound, (B) a compound having a phenolic hydroxyl radical, and (C) a compound selected from the group consisting of alcohols, esters, ketones and carboxylic acids, in a matrix resin which is obtained by blending vinyl chloride-vinyl acetate-vinyl alcohol copolymer and/or vinyl chloride-vinylidene chloride copolymer in vinyl chloride-vinyl acetate-copolymer, said vinyl chloride-vinyl acetate-vinyl alcohol copolymer and/or vinyl chloride-vinylidene chloride copolymer being blended in a ratio of 10% to 70% by weight with said vinyl acetate copolymer, said particles having a particle size in the range of 0.1 to 2.0 µm, so as to (i) exhibit reversible change in color and in transparency in response to a temperature variation with hysteresis with a temperature difference of 10° C. to 50° C. between the low trigger temperature and the high trigger temperature, (ii) have the transparency exhibited above the high trigger temperature higher than that exhibited below the low trigger temperature, and (iii) be capable of reversibly storing a state developed above said high trigger temperature and a state developed below said low trigger temperature in a temperature range between the high and low trigger temperatures.

11. A temperature-dependent color/transparency storing resin layer according to claim 10, wherein a state changed at each temperature below the low trigger temperature or above the high trigger temperature shows a haze value of not more than 35% so as to exhibit reversible change between the colored transparent state and the uncolored transparent state.

12. A laminate member according to claim 10, wherein said substrate is a transparent substrate.

13. A laminate member according to claim 10, wherein a methacrylic resin layer with the glass transition point at least equal to 80° C. is provided on the surface of said substrate as an undercoat layer.

14. A laminate member according to claim 10, wherein a layer consisting of transparent methacrylic or acrylic resin or a copolymer thereof, soluble in alcohol or aliphatic hydrocarbon, is laminated on the temperature-dependent color/transparency storing resin layer.

15. A laminate member according to claim 10, further comprising a layer exhibiting at least one of the optical properties selected from group consisting of luster, lustrous reflectance, optical interference, brilliance, hologramic property, metallic gloss, pearly gloss, and fluorescence, provided on the surface of the substrate.

16. A laminate member according to claim 10, which constitutes at least a part of a three dimensional article.

* * * * *

UNITED STATES PATENT AND TRADEMARK OFFICE
CERTIFICATE OF CORRECTION

PATENT NO. : 5,721,059

DATED : February 24, 1998

INVENTOR(S) : TSUTOMU KITO, ET AL.

Page 1 of 3

It is certified that error appears in the above-identified patent and that said Letters Patent is hereby corrected as shown below:

Title page;

AT [56] REFERENCES CITED

U.S. PATENT DOCUMENTS

"5,316,553 5/1994 Nakagawa et al." should read
--5,316,513 5/1994 Nakagawa et al.--.

FOREIGN PATENT DOCUMENTS

"07040660 2/1995 Japan" should read
--7-040660 2/1995 Japan--.

COLUMN 2

Line 24, "is" should read --can--.

COLUMN 3

Line 16, "can not" should read --cannot--;
Line 33, "can not" should read --cannot--; and
Line 39, "no" should be deleted.

COLUMN 6

Line 38, "dipalmitete," should read --dipalmitate,--;
Line 43, "cyclohexanedoil"" should read --cyclohexanediol-- and "1,4-cyclohexanedoil" should read --1,4-cyclohexanediol--; and
Line 63, "form" should read --from--.

UNITED STATES PATENT AND TRADEMARK OFFICE
CERTIFICATE OF CORRECTION

PATENT NO. : 5,721,059

DATED : February 24, 1998

INVENTOR(S) : TSUTOMU KITO, ET AL.

It is certified that error appears in the above-identified patent and that said Letters Patent is hereby corrected as shown below:

COLUMN 8

Line 3, "Further" should read --Further,--;
    Line 32, "tetramethyl-4piperidil)" should read
        --tetramethyl-4-piperidil)--;
    Line 34, "6-tetrametyl" should read --6-tetramethyl--;
    Line 35, "6-tetrametyl" should read --6-tetramethyl--;
    Line 43, "6-pentametyl" should read --6-pentamethyl--; and
    Line 55, "tetrametyl-20" should read --tetramethyl-20--.

COLUMN 9

Line 65, "Also" should read --Also,--.

COLUMN 11

Line 52, "the" (third occurrence) should be deleted.

COLUMN 15

Line 40, "Also" should read --Also,--.

COLUMN 16

Line 12, "Also" should read --Also,--; and
    Line 42, "containing the" should be deleted.

COLUMN 17

Line 16, "Also" should read --Also,--.

COLUMN 18

Table 1, "can not" should read --cannot--.

UNITED STATES PATENT AND TRADEMARK OFFICE
CERTIFICATE OF CORRECTION

PATENT NO. : 5,721,059
DATED : February 24, 1998
INVENTOR(S) : TSUTOMU KITO, ET AL.

It is certified that error appears in the above-identified patent and that said Letters Patent is hereby corrected as shown below:

COLUMN 19

Table 2, "can not" should read --cannot--.

COLUMN 20

Line 62, "applied to" (second occurrence) should be deleted.

COLUMN 23

Line 21, "ore" should read --or--.

Signed and Sealed this

Twenty-second Day of September, 1998

Attest:

BRUCE LEHMAN

Attesting Officer     Commissioner of Patents and Trademarks